US008478803B2

(12) United States Patent
Bent et al.

(10) Patent No.: US 8,478,803 B2
(45) Date of Patent: Jul. 2, 2013

(54) MANAGEMENT OF LOGICAL STATEMENTS IN A DISTRIBUTED DATABASE ENVIRONMENT

(75) Inventors: Graham A. Bent, Southampton (GB); Patrick Dantressangle, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 12/203,789

(22) Filed: Sep. 3, 2008

(65) Prior Publication Data
US 2009/0077075 A1      Mar. 19, 2009

(30) Foreign Application Priority Data

Sep. 19, 2007  (GB) .................................. 0718214.0

(51) Int. Cl.
*G06F 17/00* (2006.01)
(52) U.S. Cl.
USPC .......................................... 707/966; 707/971
(58) Field of Classification Search
USPC ................................................ 707/966, 971
See application file for complete search history.

(56) References Cited

U.S. PATENT DOCUMENTS

| | | | |
|---|---|---|---|
| 5,712,960 A * | 1/1998 | Chiopris et al. ................. 706/61 |
| 7,007,045 B2 * | 2/2006 | Starbuck ....................... 707/610 |
| 7,174,382 B2 * | 2/2007 | Ramanathan et al. ........ 709/227 |
| 7,299,277 B1 * | 11/2007 | Moran et al. .................. 709/224 |
| 7,376,632 B1 * | 5/2008 | Sadek et al. .................... 706/12 |
| 7,783,777 B1 * | 8/2010 | Pabla et al. ................... 709/238 |
| 7,822,594 B2 * | 10/2010 | Haviv et al. .................... 703/21 |
| 7,987,152 B1 * | 7/2011 | Gadir ............................ 707/602 |
| 2004/0122661 A1 * | 6/2004 | Hawkinson et al. ............ 704/10 |
| 2007/0179993 A1 * | 8/2007 | Arruza .......................... 707/202 |
| 2007/0266009 A1 * | 11/2007 | Williams .......................... 707/3 |
| 2008/0123559 A1 * | 5/2008 | Haviv et al. .................... 370/255 |

OTHER PUBLICATIONS

Raghu Ramakrishnan, Database Management Systems (1998), published by WCB/McGraw-Hill, pp. 544-545, 554-556, 567-569.*

* cited by examiner

*Primary Examiner* — Hung T Vy
(74) *Attorney, Agent, or Firm* — Steven L. Nichols; Van Cott, Bagley, Cornwall & McCarthy P.C.

(57) ABSTRACT

A method for managing a logical statement within a distributed database includes checking, responsive to receipt of a first logical statement for by first database management system node, whether the first logical statement is stored within a segment of the distributed database; and storing, responsive to a determination that the first logical statement is not stored within a segment of the distributed database, storing the first logical statement in at least one of non-unique fact table and unique fact table.

25 Claims, 16 Drawing Sheets

MANAGEMENT OF LOGICAL STATEMENTS IN A DISTRIBUTED DATABASE ENVIRONMENT

GOVERNMENT LICENSE RIGHTS

The U.S. Government has a paid-up license in this invention and the right in limited circumstances to require the patent owner to license others on reasonable terms as provided for by the terms of W911NF-06-3-0001 awarded by the U.S. Army Research Laboratory.

BACKGROUND OF THE INVENTION

A federated database is made up of a number of interconnected database management systems (DBMSs), each of which manages one or more databases. The federated database allows a single query to access the databases through the interconnected DBMSs. The query is received by the federated database and propagated over connections between the various DBMSs. DBMSs that control databases targeted by the query then translate the query into actions that are compatible with the databases they control.

As the size of a federated database increases, various scaling problems can occur. For example, as new DBMSs are added to the federated database, the number of connections between the DBMSs may increase in a combinatorial fashion. This can lead to an unwieldy number of connections in a federated database that contains only a moderate number of DBMSs. Further, the network topology of the federated database may also lead to data that is inaccessible following the failure of a connection or DBMS. Additionally, when a query is made to the database federation, the communication overhead in distributing the query to all of the DBMSs can be significant. Another problem that can be associated with federated databases is that receiving and updating data, such as logical statements, can involve a significant amount of overhead to ensure that all instances of the data are updated and correctly indexed for searching.

BRIEF SUMMARY OF THE INVENTION

A method for managing a logical statement within a distributed database includes checking, responsive to receipt of a first logical statement for by first database management system node, whether the first logical statement is stored within a segment of the distributed database; and storing, responsive to a determination that the first logical statement is not stored within a segment of the distributed database, storing the first logical statement in at least one of non-unique fact table and unique fact table. An apparatus for managing logical statements includes a system with a first data structure for storing non-unique logical statements and a second data structure for storing unique logical statements under control of a first database management system node, the apparatus including a checker, responsive to receipt of a first logical statement for the first database management system node, for checking whether the first logical statement is stored in the first data structure and second data structure; and an inserter, responsive to a determination that the first logical statement is not stored in the first data structure or the second data structure, for storing the first logical statement in the second data structure.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
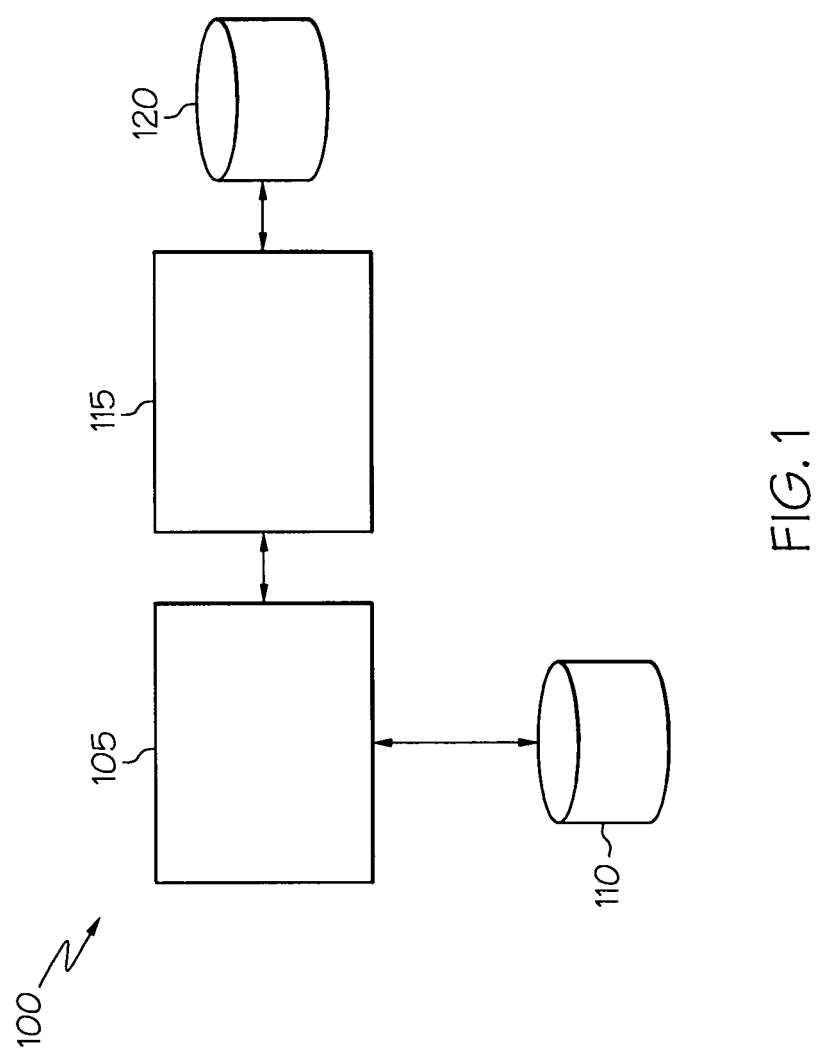
FIG. 1 is a block diagram of an illustrative a distributed database, according to one embodiment of principles described herein.

Computer databases are structured collections of data which are managed to meet the needs of a community of users. A computer database relies on software, called a database management system (DBMS), to manage the access and organization of the data. An organization may depend on a variety of computer databases which may not be natively compatible. For example, the various computer databases within an organization may use different operating systems, query languages, protocols, or data structures. To unify the various computer databases within an organization, a federated database can be formed. The federated database is a system in which the various DBMSs act as gateways through which the databases can be accessed using a single query.

They also act interpreters which translate the various queries into actions that are compatible with the databases they control.

As the size of a database federation increases, various scaling problems can occur. For example, as new DBMSs are added to the federated database, the number of connections between the DBMSs can increase in a combinatorial fashion. This can lead to an unwieldy number of connections in a federated database that contains only a moderate number of DBMSs. For example, a federated database system may use a connection topology that dictates that each DBMS must be connected to every other DBMS. If a new DBMS is added to a federated database that contains eight existing systems, the number of connections must increase by eight to allow the new DBMS to connect with each of the existing DBMSs. This combinatorial increase in connections can result in an inefficient and overly redundant communication topology. Additionally, in some network topologies the failure of a connection or DBMS may result in one or more databases becoming inaccessible.

Another scaling problem can arise during the distribution of communications through the communication network of a federated database. When a query is made to the database federation, the communication overhead in distributing the query to all of the DBMSs can be significant.

For example, when a query is made within the federated database, one or more DBMSs decompose the query into sub-queries for submission to the relevant constituent DBMSs. Accordingly, as the size of the federation increases, the number of queries associated with obtaining data also increases. Additionally, when a new DBMS is to be added to the distributed database federation, each of the other existing DBMSs must be updated. This results in limited scalability and significant network and management overheads.

Further, within databases, data can be represented in a variety of fashions and formats. For example, data can be represented and stored in the form of logical statements that are made up of a subject, predicate and object. These logical statements are called triples. Each triple is associated with a logical (mathematical) relationship (denoted by the predicate) between the subject and the object. The triple represents a "fact" and the term "fact" will be used interchangeably with the term "triple" throughout the remainder of the specification. Facts can be combined through a process of logical inference in order to determine new facts. Efficiently performing logical inference from existing facts within a distributed repository can also be challenging. In some circumstances, these problems are solved by using a single repository for the storage of triples. However, this limits the scalability of the system and creates a single point of failure.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

According to one illustrative embodiment, a module is added to each of the distributed databases which allows for the automatic connection of a new DBMS to a federated database or healing of the network after the loss of a connection or malfunction of a DBMS. The module implements a scale-free networking approach that uses a preferential attachment strategy. This preferential attachment strategy creates an efficient and robust network that utilizes a number of highly connected DBMSs that serve as hubs. However, all connections are not routed through the hubs. As directed by a number of parameters, connections are made which bypass the hubs and provide redundancy to the network topology. Further, to provide additional robustness within the system, data can be replicated within databases. Consequently, if a connection or DBMS is inoperative, the data can still be access on a redundant database.

In one illustrative embodiment, the method of making and transmitting a query throughout this scale-free network significantly reduces overhead. The query is independently evaluated by a receiving DBMS and propagated to other directly connected DBMSs. This propagation process continues for predetermined number of propagation cycles. This propagation process reduces the overhead associated with making a query. Rather than making a query to each individual DBMS, the originating DBMS "broadcasts" a query to directly connected DBMSs and then simply waits for responses. The query propagates through the federated database and DBMSs that have relevant data transmit this data to a designated recipient. Additionally, the replication strategy discussed above can increase the efficiency of the federated database by allowing data to be retrieved from more closely linked DBMSs which require fewer propagation cycles to reach.

Additionally, a module which manages the handling of logical statements within the federated database can be added to each DBMS within the system. According to one illustrative embodiment, the module may be implemented as an application or a database stored procedure. Upon receiving a logical statement, the logical management module provides functions for checking various databases within the federated database to determine the logical statement is already stored within the database. An inserter then inserts the logical statement one or more databases according to the results of the checking function. An inference component then accesses various logical rules and applies the logical rule to the stored logical statements to create an inferred logical statement. As described above, these inferred logical statements are then checked for redundant instances that are already stored in the federated database and then inserted appropriately into a designated database. In this way, needless redundancy is reduced and logical statements can be updated by a single DBMS.

A typical distributed database configuration (100) is depicted in FIG. 1. A first database management system (DBMS) (105) is operable to access a first database (120) associated with a first back end computing system (115). The first DBMS (105) is also operable to access a second database (110) that is "local" to the first DBMS (105) (that is, the second database (110) is accessible using a direct connection). The database configuration (100) is termed "distributed" because the first DBMS (105) is operable to access multiple databases.

Figure 2:
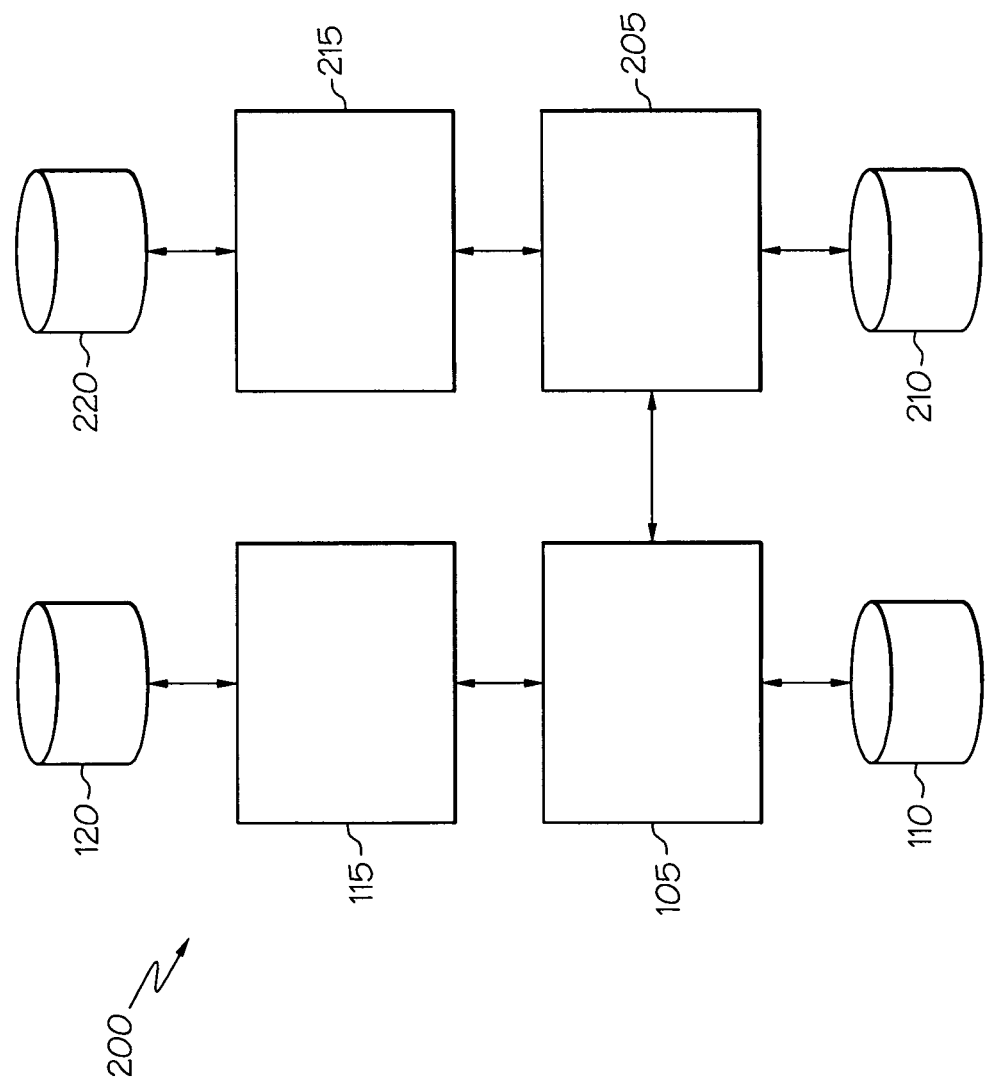
FIG. 2 is a block diagram of an illustrative a database federation, according to one embodiment of principles described herein.

FIG. 2 is an illustrative example of a distributed database federation (200). As discussed above, a database federation is a type of virtualized database that allows constituent database systems to remain autonomous but provides a uniform front-end user interface, enabling users to store and retrieve data in multiple noncontiguous databases with a single query. Database federations are typically comprised of a number of DBMSs and their associated local databases, backend systems, and backend databases. According to one exemplary embodiment, the first DBMS (105) is fully interconnected to each of the other DBMSs in the federation. For example, the first DBMS (105) is fully interconnected to a second DBMS (205). The second DBMS (205) is operable to access a second database (220) associated with a second back end computing system (215). The second DBMS (205) is also operable to access a second local database (210). The backend computing systems (115, 215) are typically heterogeneous and not interconnected with other backend computing systems. The DBMSs act as interpreters and intermediaries between the various databases and backend computing systems. Each of the DBMSs maintains robust interconnections with other DBMSs in the federation. Consequently, as the number of DBMSs in a distributed database federation increases, the number of connections between the DBMSs increases in a combinatorial fashion. When a query is made within the federated database, one or more DBMSs decompose the query into sub-queries for submission to the relevant constituent DBMSs. Accordingly, as the size of the federation increases, the number of queries associated with obtaining data also increases. Additionally, when a new DBMS is to be added to the distributed database federation, each of the other existing DBMSs must be updated. This results in limited scalability and significant network and management overheads.

Figure 3:
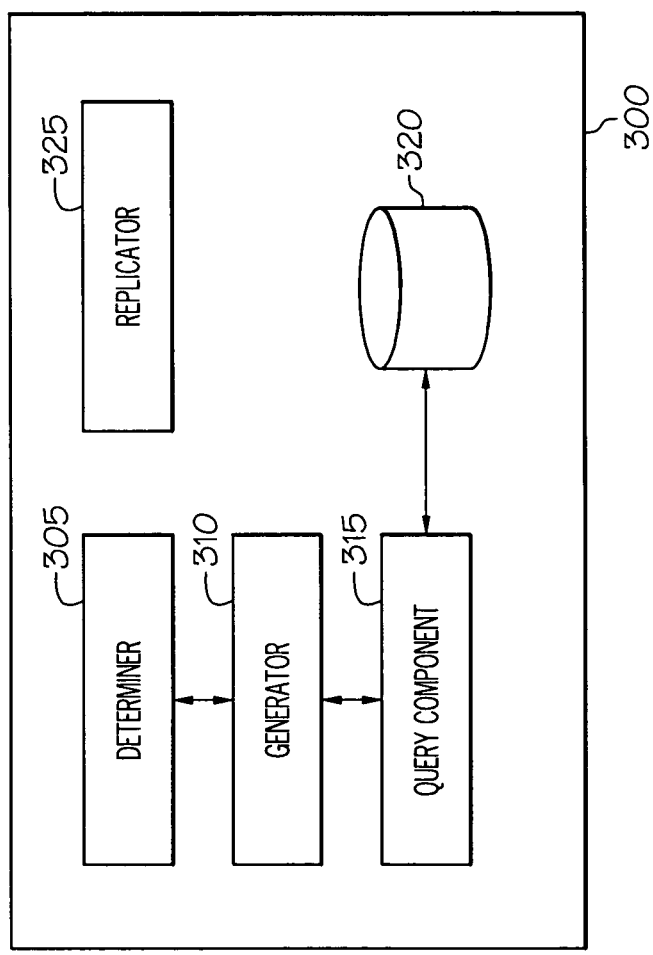
FIG. 3 is a block diagram of an illustrative an apparatus for propagating a query in a federated database, according to one embodiment of principles described herein.

FIG. 3 is an illustrative diagram showing an apparatus (300) that is made up of a first determiner (305); a first generator (310); a query component (315) associated with a first storage component (320); and a replicator (325). The apparatus (300) is operable to communicate with a plurality of DBMSs. As discussed above, each DBMS is typically configured to access a one or more databases including local databases and backend databases. Within the various databases, a variety of data is stored. Typically, the data is stored in a table format with a number of rows and columns. Additionally, each database contains a logical table that allows a user to view (or update) the data in the table. The function of each of the components within the apparatus (300) is described below.

Figure 4:
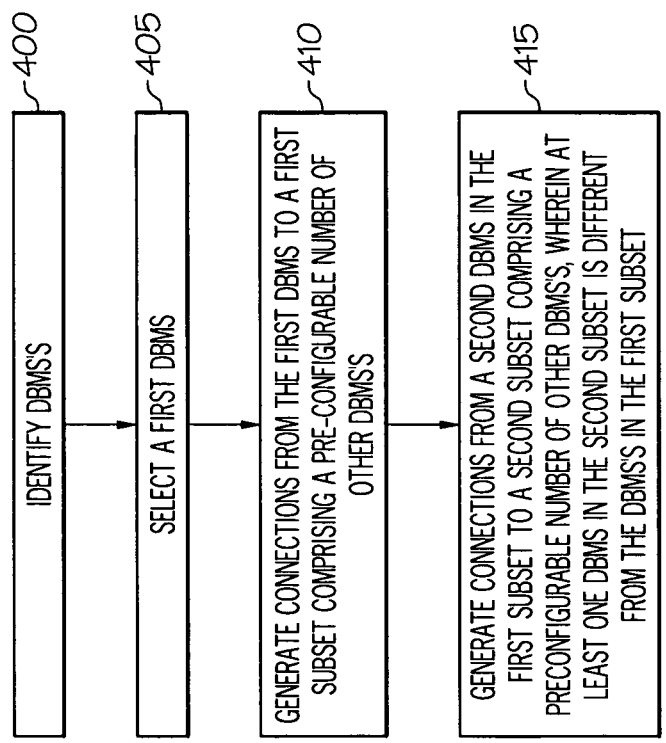
FIG. 4 is a flowchart of an illustrative method for connecting a new database management system to a federated database, according to one embodiment of principles described herein.

FIG. 4 is a flowchart showing one illustrative method for adding one or more DBMSs to a distributed database federation. In a first step, the determiner (305) identifies one or more DBMSs to be added to a distributed database federation (step 400). Next, the generator (310) selects a first DBMS (step 405) and integrates it into the database federation by connecting it to a first subset of DBMSs (step 410). According to one exemplary embodiment, the generator (310) obtains user input regarding which connections should be made between the first DBMS and the first subset of the remaining plurality of identified DBMSs. However, the first DBMS is not fully interconnected to all of the remaining plurality of identified DBMSs. Next, the generator (310) identifies a second DBMS from within the first subset of DBMSs and connects this second DBMS to a second subset of DBMSs, wherein the second subset comprises at least one DBMS which is not comprised in the first subset (step 415).

According to one illustrative embodiment, a preferential attachment network connection strategy is used. In the following discussion, the term "node" refers generally to a network element that is configured to make one or more connections with other network elements. In the embodiment below, the term "node" refers specifically to a DRMS within a federated database. In preferential attachment strategy, connections are preferentially made with network nodes according to how many connections a node already has. A node with more connections has a higher likelihood of being selected to receive additional connections. For example, a first node may query, in turn, a number of other nodes in order to determine a number of connections associated with each of the nodes. In response, the first node determines probabilistically one or more nodes to connect to. A probability of a second node being chosen is proportional to a number of connections the second node maintains. This results in a scale-free network that has a number of highly connected nodes known as hubs. In some embodiments, the number of hubs in relation to the number of non-hubs remains constant as a scale-free network changes in size.

According to one illustrative embodiment, the first generator (310) uses an automatic connection strategy associated with scale-free networks termed preferential attachment. The first generator (310) queries, in turn, each of the remaining plurality of identified DBMSs in order to determine a first subset of the remaining plurality of identified DBMSs. For example, the first generator (310), queries, in turn, each of the remaining plurality of identified DBMSs in order to determine a number of connections associated with each of the remaining plurality of identified DBMSs. In response, the first generator (310) determines probabilistically a first subset of the remaining plurality of identified DBMSs that the first DBMSs should connect to.

Using the preferential attachment strategy, a probability of a DBMS being chosen for the first subset is proportional to a number of connections associated with the DBMS. As discussed above, this results in a number of highly connected DBMSs (known as hubs). According to one exemplary embodiment, the number of highly connected DBMSs in relation to the number of non-highly connected DBMSs remains constant as the distributed database federation changes in size.

Figure 9A:
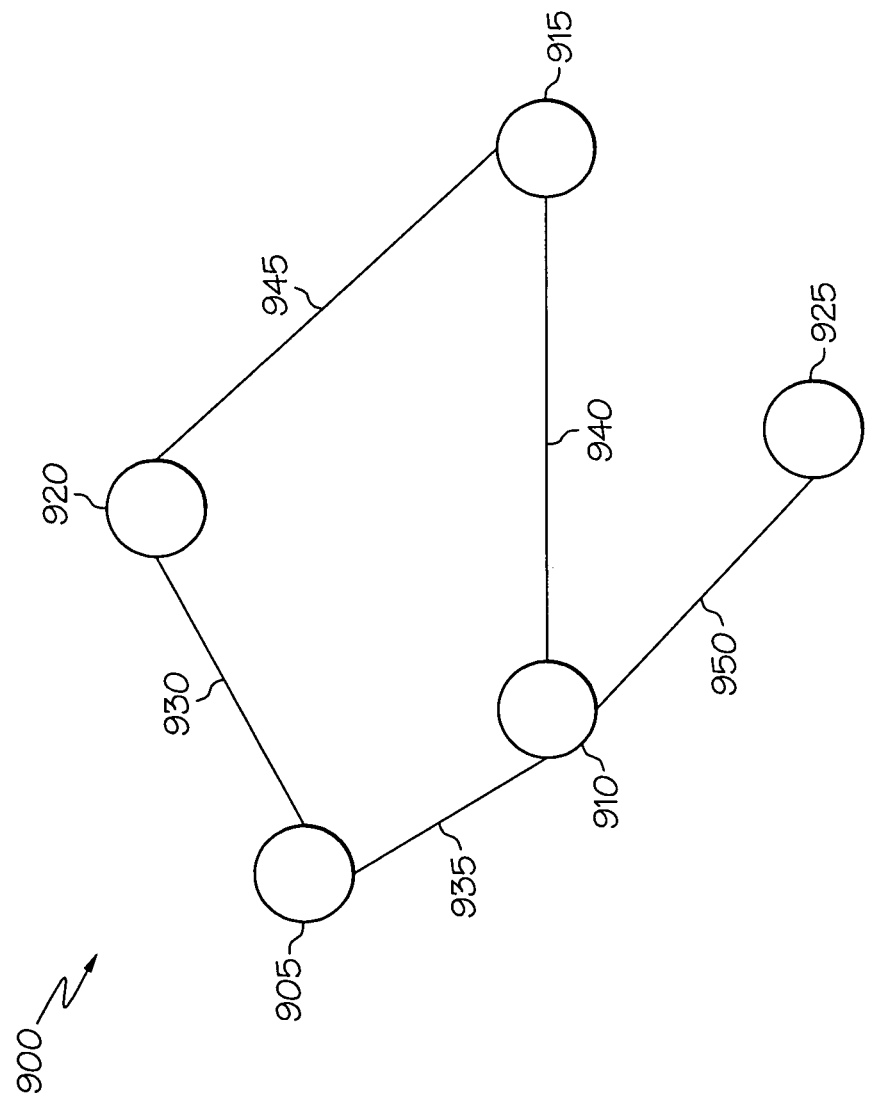
FIG. 9A is diagram of an illustrative database federation, according to principles described herein.

FIG. 9A depicts an overview of a network (900) comprising a number of nodes (905, 910, 915, 920 and 925) and connections (930, 935, 940, 945 and 950). Each node is associated with an apparatus (1000). A block diagram of the apparatus (1000) is shown in FIG. 10, wherein the apparatus (1000) comprises a second determiner (1005); a probabilistic component (1010) associated with a second storage component (1013) comprising probabilistic data; a second generator (1015); a transmitter (1020) and a receiver (1025).

Figure 10:
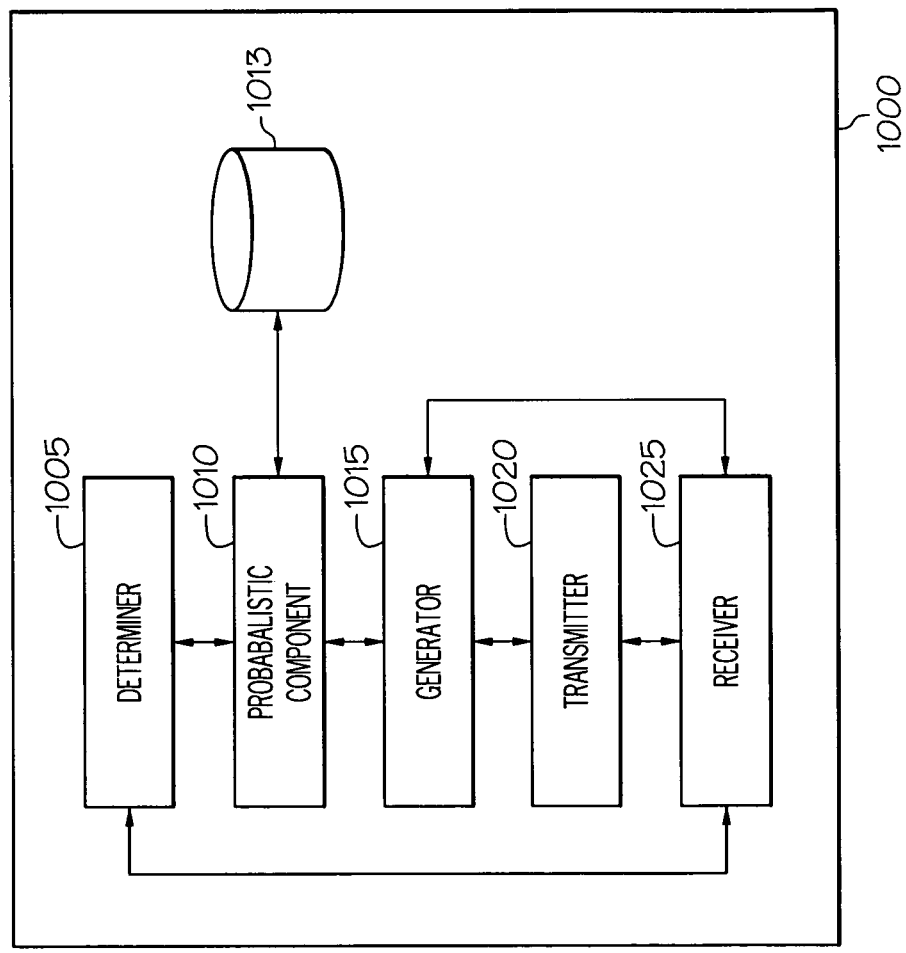
FIG. 10 is a block diagram of an illustrative apparatus for enabling connections between nodes in a database federation, according to one embodiment of principles described herein.
Figure 11:
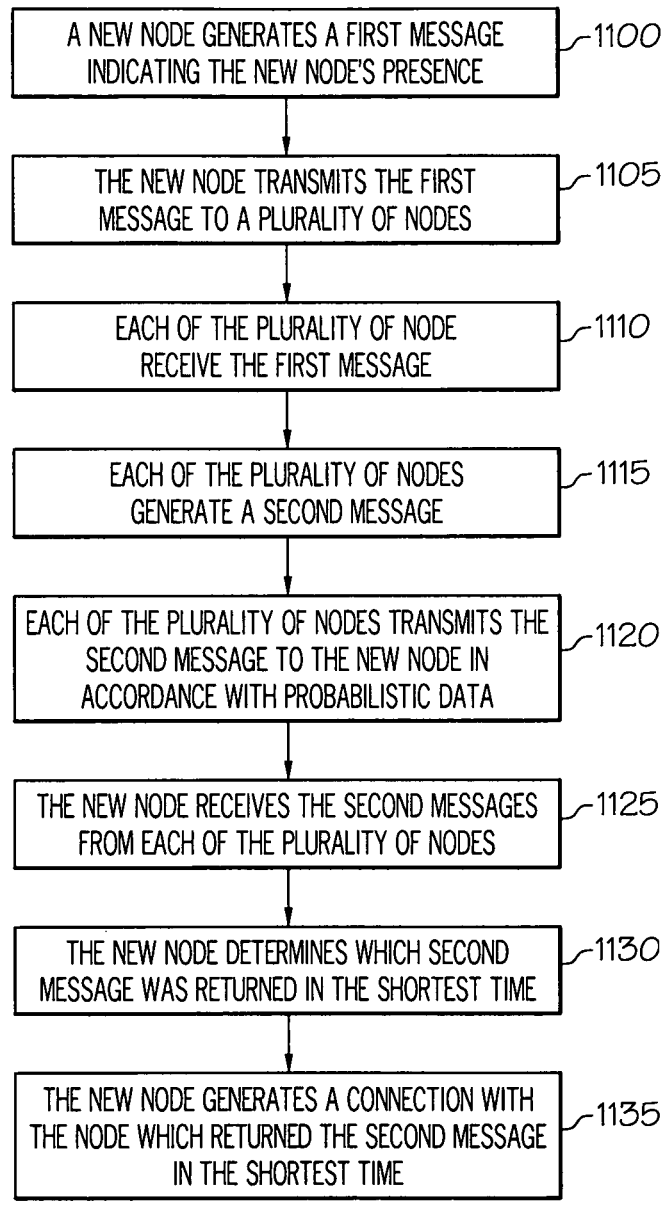
FIG. 11 is a flowchart of an illustrative method for creating new connections between nodes in a database federation, according to one embodiment of principles described herein.

FIG. 11 is a flowchart showing one illustrative method for incorporating one or more new nodes into an illustrative network shown in FIG. 9A and incorporating the illustrative apparatus shown in FIG. 10. With reference to FIG. 11, when a new node is to join the network (900), the second generator (1015) generates a first message (step 1100). The first message comprises an identifier associated with the new node and an indicator indicating that the new node wishes to join the network (900). The transmitter (1020) then transmits a copy of the first message to each of the nodes (905, 910, 915, 920 and 925) in the network (900) (step 1105). According to one embodiment, the messages are addressed and delivered using identifiers associated with each of the nodes (905, 910, 915, 920 and 925).

The receiver (1025) of each of the nodes (905, 910, 915, 920 and 925) receives a copy of the first message (step 1110). In response to receipt of a copy of the first message, the second determiner (1005) of a node determines a number of connections associated with the node. The second generator (1015) of a node then generates a second message indicating the availability of the node to make a connection with the new node and identifier associated with the node (step 1115). The second generator (1015) passes the second message to the transmitter (1020).

In the illustrative network shown in FIG. 9A, a first node (905) comprises two connections; a second node (910) comprises three connections; a third node (915) comprises two connections; a fourth node (920) comprises two connections and a fifth node (925) comprises one connection.

It should be understood that a number of connections associated with a node can be associated with, for example, the processing capability of the node. The second determiner (1005) passes data associated with the determined number of connections to the probabilistic component (1010). The probabilistic component (1010) of a node uses the data associated with the determined number of connections and probabilistic data stored in the second storage component (1013) to determine a value of a maximum time delay "$T_d$" that the node will wait before transmitting the second message to the new node.

The probabilistic data is shown below, wherein the value of "$T_d$" is inversely proportional to the number of connections ("$N_d$"). A value "$t_0$" is a constant used by every node:

$$T_d = t_0/N_d \qquad \text{Eq. 1}$$

In response to determining a value of "$T_d$", the probabilistic component (1010) determines a time delay "$t_d$" by randomly selecting a value between "0" and "$T_d$". Table 1 shows the number of connections for a given node and the associated values for the maximum time delay "$T_d$" when the constant to is equal to 12.

TABLE 1

| Number of connections | Max. Time Delay "$T_d$" |
| --- | --- |
| 1 | 12 milliseconds |
| 2 | 6 milliseconds |
| 3 | 4 milliseconds |
| 4 | 3 milliseconds |

As discussed above, the probabilistic component then generates a random time delay in transmitting the message to the new mode that is between 0 and "$T_d$". Continuing with the example above, the first node (905) has two connections (930, 935) which results in a maximum time delay of 6 milliseconds (ms). The probabilistic generator then generates a random time delay between 0 milliseconds and 6 milliseconds. For illustration purposes, assume that the probabilistic generator of the first node (905) generates a time delay "$t_d$" of 3 ms. The other nodes similarly determine the total number of connections at the node, the maximum time delay, and generate a time delay "$t_d$". For example, the second node (910) has three connections (935, 940, 950), a maximum time delay of 4 milliseconds and generates an actual time delay "$t_d$" of 4 milliseconds; the third node (915) has two connections (940, 945), a maximum time delay of 6 milliseconds and generates an actual time delay "$t_d$" of 3 milliseconds; the fourth node (920) has two connections (930, 945) a maximum time delay of 6 milliseconds and generates an actual time delay "$t_d$" of 6 milliseconds; and the fifth node (925) has one connection (950), a maximum time delay of 12 milliseconds and generates an actual time delay "$t_d$" of 7 milliseconds.

The probabilistic component (1010) passes the value for "$t_d$" to the transmitter (1020). The transmitter (1020) transmits (step 1120) the second message in accordance with the value for "$t_d$". In the first example, a second message associated with the first node (905) is sent after a time delay of 3 ms; a second message associated with the second node (910) is sent after a time delay of 4 ms; a second message associated with the third node (915) is sent after a time delay of 3 ms; a second message associated with the fourth node (920) is sent after a time delay of 6 ms and a second message associated with the fifth node (925) is sent after a time delay of 7 ms.

Thus, a node with a higher number of connections responds probabilistically faster than a node with a lower number of connections. However, a random selection of "$t_d$" allows for a degree of randomness associated with the time of response. For example, a node with a higher number of connections may respond slower than a node with a lower number of connections.

According to one exemplary embodiment, the receiver (1025) of the new node receives each of the second messages. The second determiner (1005) then ranks the second messages according to criteria. For example, the second determiner (1005) of the new node ranks the second messages in accordance with a time value associated with receipt of the second messages. The second determiner (1005) uses the second messages to determine (step 1130) identifiers associated with a pre-configurable number of nodes having an associated second message that has a fastest time value associated with receipt. It should be understood that the pre-configurable number can be associated with pre-configurable number of connections that can be made to the new node. Typically, a time value associated with receipt is proportional to "$t_d$". However, due to differing delays associated with network connections and lost messages for example, a time value associated with receipt may not be proportional to "$t_d$". In the first example, the pre-configurable number is "1" and the identifier is associated with the second node (910) having an associated second message that has a fastest time value associated with receipt. In response to the determination, the second generator (1015) of the new node generates (step 1135) a connection to the second node (910).

The randomness introduced in the return time by the probabilistic generators and network delays provides for connections to be made with nodes other than the node with the most existing connections, thereby building a more robust network. For example, in the event that a hub node is inoperable, alternative routes exist to communicate with the remaining nodes.

Figure 9B:
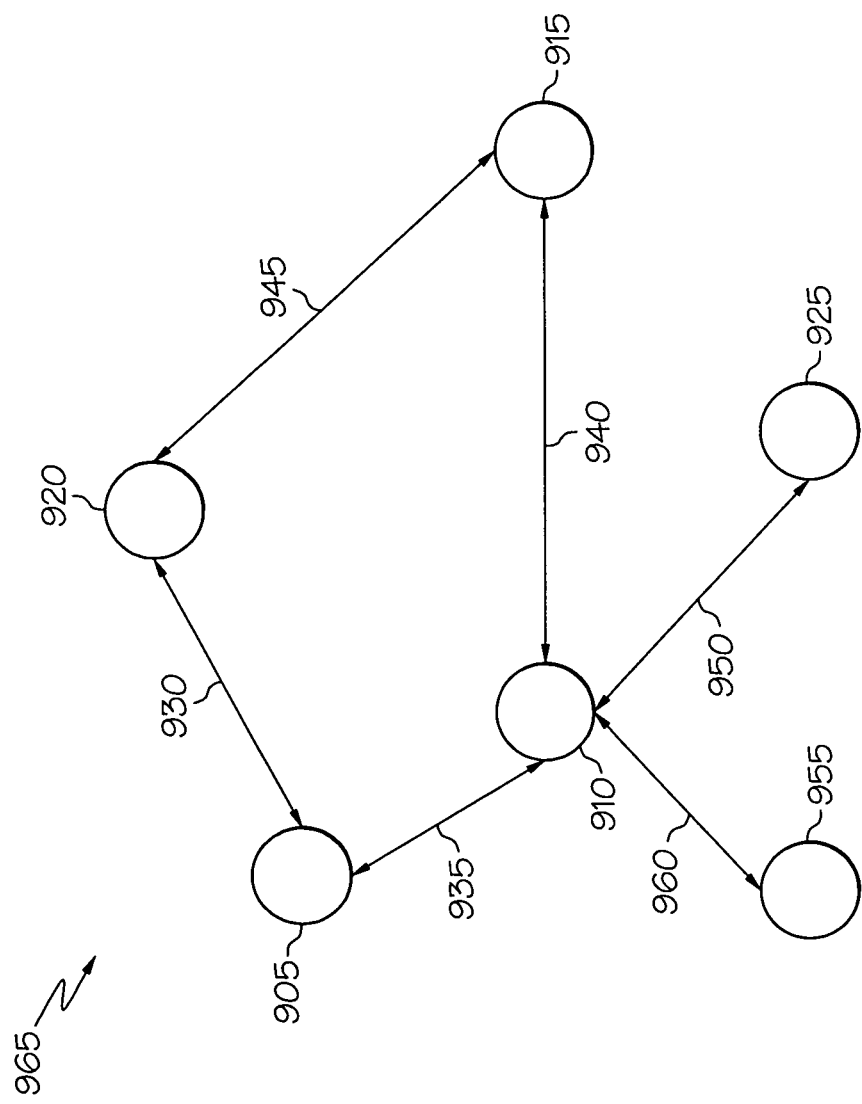
FIG. 9B is diagram of an illustrative database federation where a new node is connected to the database federation of FIG. 9A, according to principles described herein.

An overview of the network (965) is shown in FIG. 9B, wherein the new node (955) is connected to the second node (910) by a connection (960). The discussion above with reference to FIGS. 9, 10, and 11 is only one illustrative embodiment of a method for making a connection between various nodes in a federated database network. Other values, probabilistic methods, network elements, and communication strategies could be used. By way of example and not limitation, the connection process executed by the apparatus (1000) can also be used in the event that connection between two existing nodes fails.

According one illustrative embodiment, when a pre-configurable number of vertices have connected to the new node, a node that is yet to send a second message (e.g. because the node has a long time delay) is suppressed from sending the second message. Additionally a node may be adapted to maintain a configurable number ($n_{out}$) of "outgoing" connections. With reference to the network (970) in FIG. 9C and with reference to a first node (975), an outgoing connection is a connection that originates from the first node (975) to another node—e.g. connections 991, 992 and 993 to nodes 980, 985 and 990 respectively. In an example, the first node (975) is adapted to maintain three outgoing connections.

Figure 9C:
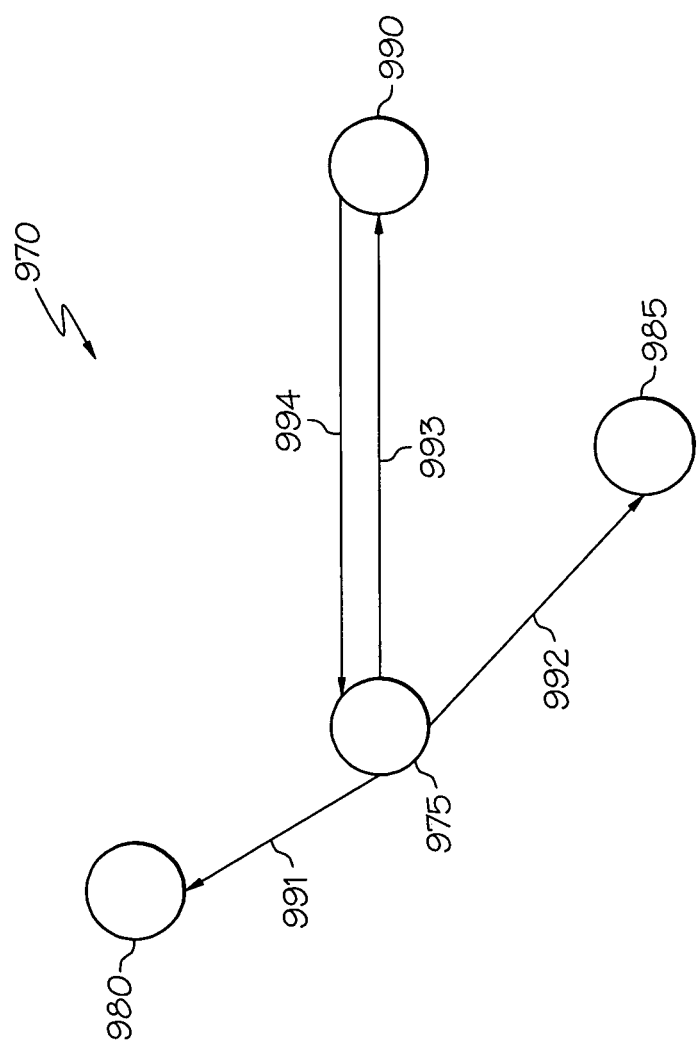
FIG. 9C is a diagram of an illustrative database federation showing incoming and outgoing connections between nodes, according to one embodiment of principles described herein.

A node also has a configurable number ($n_{in}$) of "incoming" connections available for a new node to connect to the node. With reference to FIG. 9C and with reference to a first node (975), for example, the first node (975) has a maximum number of one incoming connection. In FIG. 9C, the incoming connection has been used (e.g. connection 994 from node 990).

If by making a connection to a new node, the sum of $n_{out}$ and $n_{in}$ is to be exceeded (that is, if the node has no further available connections), the node is suppressed from sending the second message. For example, the first node (975) has no further available connections as each of the three outgoing connections is used and the one incoming connection is also used. The first node (975) is suppressed from sending the second message.

The apparatus and method for generating a connection described above is configured to make a connection without requiring multiple queries to be issued. This reduces the network overhead associated with making connections and reduces the time to make a new connection or repair a broken connection. Furthermore, the apparatus and method is parallel in its nature, in that a new node need not query each existing node in turn. Rather, the new node "broadcasts" a first message. Consequently, this apparatus and method can be highly effective in the generation of scale-free networks.

The probabilistic connection strategy favors connections to a node with a higher number of connections (e.g. wherein the node has a higher processing capability). However, because the random selection of the actual time delay "$t_d$", network communication delays, and lost messages, a node with a higher number of connections may respond slower than a node with a lower number of connections. Consequently, a highly connected node may not always be the node to which a connection is generated, resulting in a fairer connection strategy and a more robust network topology. Additionally, the inherent bias of the method toward more capable nodes and nodes with faster communication times streamlines the network.

Figure 5:
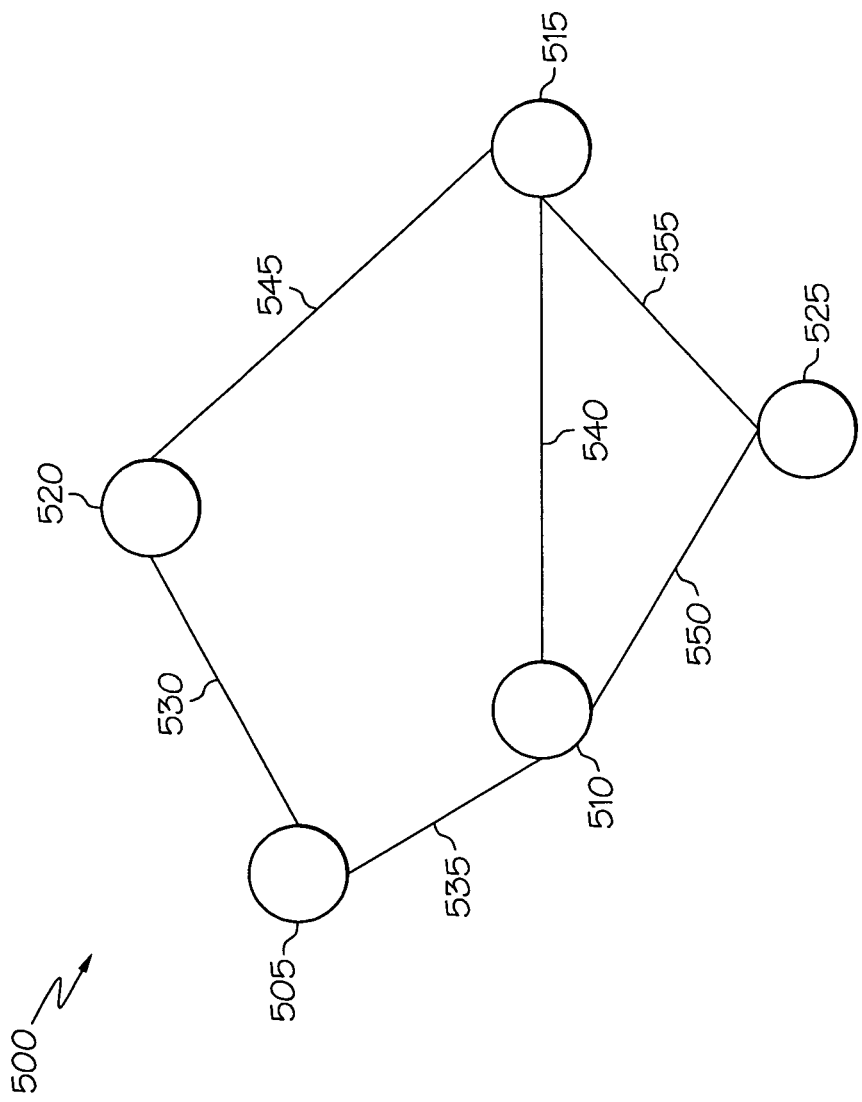
FIG. 5 is a diagram of an illustrative database federation, according to one embodiment of principles described herein.

On embodiment of a distributed database federation (500) is shown in FIG. 5. For example, a first DBMS (525) connects bi-directionally (wherein a bi-directional connection allows one DBMS to communicate with another and vice versa) to a first subset comprising a second DBMS (510) and a third DBMS (515). The third DBMS (515) connects bi-directionally to a second subset comprising the first DBMS (525) and a fourth DBMS (520). The fourth DBMS (520) connects bi-directionally to a third subset comprising the third DBMS (515) and a fifth DBMS (505). Thus, for example, although the first DBMS (525) and the fourth DBMS (520) are not directly connected, the first DBMS (525) is indirectly connected to the fourth DBMS (520) via the third DBMS (515).

According to one exemplary embodiment, the first DBMS (525) contains a combined logical table that allows it to index and address database contents that are accessible through its connection within the federated database. For example, the combined logical table may be a combination of: a first logical table of a first database comprised on a back end computing system connected to the first DBMS (525); a second logical table of a local database of the first DBMS (525); a third logical table of a second database comprised on a back end computing system connected to the second DBMS (510); a fourth logical table of a local database of the second DBMS (510); a fifth logical table of a third database comprised on a back end computing system connected to the third DBMS (515) and a sixth logical table of a local database of the third DBMS (515). The back end computing systems, associated databases, and local databases have not been shown for clarity.

Likewise, a combined logical table of the third DBMS (515) is associated with logical tables of databases comprised on back end computing systems connected to the first DBMS (525), the third DBMS (515) and the fourth DBMS (520) and logical tables of local databases of the first DBMS (525), the third DBMS (515) and the fourth DBMS (520). Similarly, an associated logical table of the fourth DBMS (520) is associated with logical tables of databases comprised on back end computing systems connected to the third DBMS (515), the fourth DBMS (520) and the fifth DBMS (505) and logical tables of local databases of the third DBMS (515), the fourth DBMS (520) and the fifth DBMS (505).

In the resulting distributed database federation, it is possible for a user who queries an associated logical table of the first DBMS (525) to access data from any database in the distributed database federation, without requiring each DBMS in the federation to be directly connected to each of the other DBMSs in the federation. For example, the user may request through the first DBMS (525) a data item from a logical database connected to the fourth DBMS (520). The first DBMS (525) lacks a direct connection with the fourth DBMS (520) but can access a logical table indexing the logical database connected to the fourth DBMS (520) through the third DBMS (515). Further, the query from the first DBMS (525) to the fourth DBMS (520) and the response can be passed through two redundant paths.

Figure 6A:
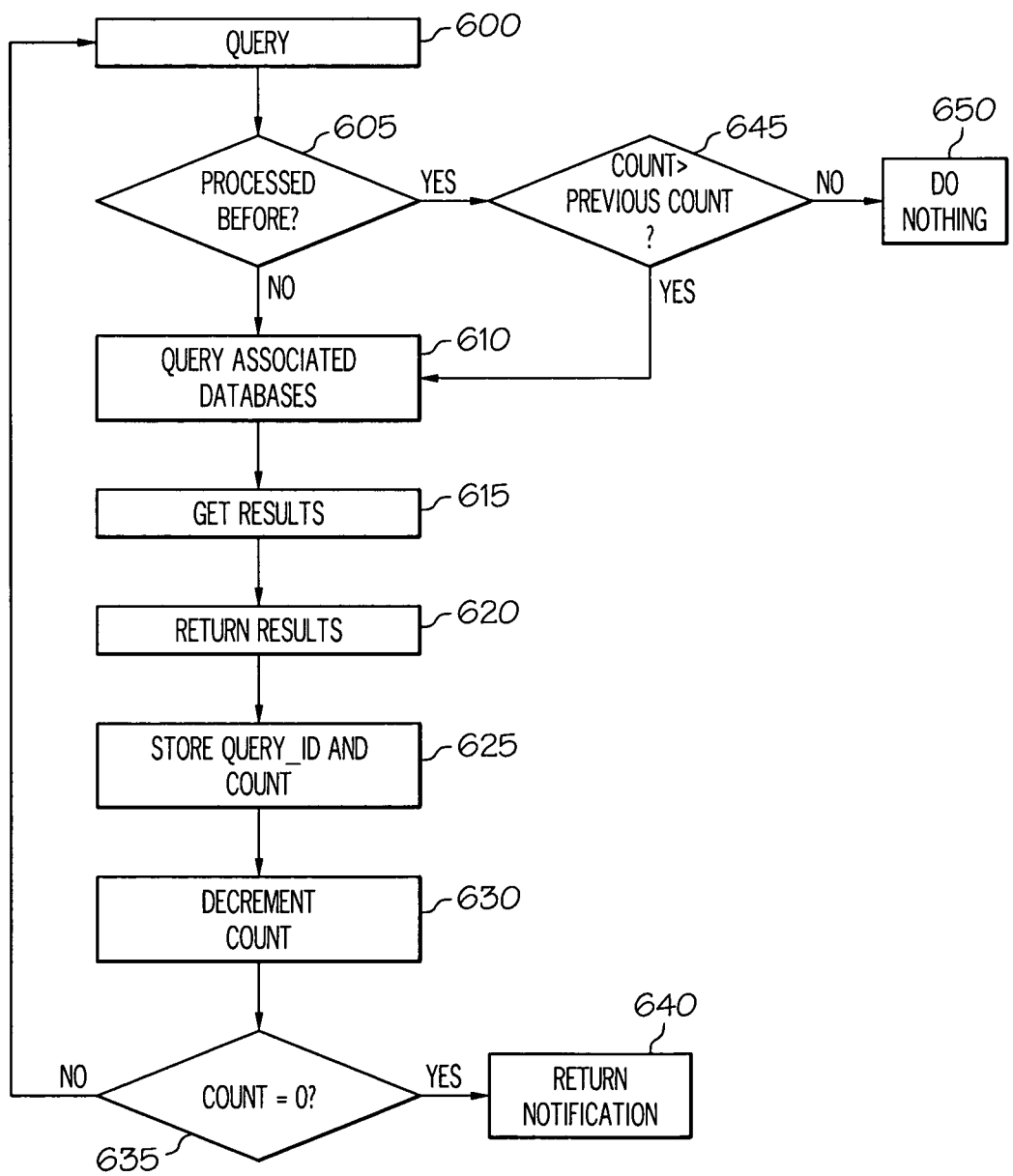
FIG. 6A is a flowchart of an illustrative method for propagating a query within a database federation, according to one embodiment of principles described herein.

FIG. 6A is a flowchart of an illustrative method for propagating a query within a database federation. According to one embodiment, a query comprises an associated query identifier (e.g. a parameter "QUERY_ID" having an associated value). In one illustrative embodiment, a query comprises an associated count value (e.g. denoted by the parameter "COUNT" and its associated value). An initial value of "COUNT" is associated with a maximum number of times a query is propagated from one DBMS to and another DBMS. A single propagation cycle is a propagation from one DBMS to another directly connected DBMS (in either direction). The count value is decremented with each propagation cycle. For example, the value of "COUNT" is "2".

At step 600, a user initiates a query of the first DBMS (525) (termed herein as "an originating DBMS") using the query component (315). In the first example, the query is associated with finding employees for company X in Europe.

The query component (315) uses the associated query identifier (e.g. "QUERY_1") to determine (step 605) whether the query has been processed before by the first DBMS (525). In the first example, the query has not been processed before by the first DBMS (525). In response, the query component (315) queries (step 610) databases associated with the first database. By way of example and not limitation these databases may comprise a database on a back end computing system connected to the first DBMS (525) and the local database of the first DBMS (525).

The query component (315) then obtains the results (step 615) and transmits (step 620) the results to the user. The query component (315) stores (step 625) the query identifier (e.g. "QUERY_1") and a current value for "COUNT" (e.g. "2") in the first storage component (320). The query component (315) decrements (step 630) the current value for "COUNT", wherein the resulting value for "COUNT" is "1". At step 635, the query component (315) determines whether the decremented value for "COUNT" is zero. In the current example, the query component (315) determines that the decremented value for "COUNT" is not zero (e.g. because the value for "COUNT" is "1"). In response, the query component (315) propagates (step 600) the query to one or more of the remaining the DBMSs in the first set (i.e. one or more DBMSs directly connected to the first DBMS (525)).

As illustrated in FIG. 5, the query component (315) propagates (step 600) the query to each of the second DBMS (510) and the third DBMS (515). Within the second DBMS (510), the query component uses the associated query identifier (e.g. "QUERY_1") to determine (step 605) whether the query has been processed before by the second DBMS (510). In the current example, the query has not been processed before by the second DBMS (510). Consequently, the query component associated with the second DBMS (510) queries (step 610) the second database comprised on a back end computing system connected to the second DBMS (510) and the local database of the second DBMS (510).

The query component (315) obtains the results (step 615) and transmits (step 620) the results to the user. The query component (315) stores (step 625) the query identifier (e.g. "QUERY_1") and a current value for "COUNT" (e.g. "1") in the first storage component within the second DBMS (510). The query component (315) decrements (step 630) the current value for "COUNT", wherein the resulting value for "COUNT" is "0".

At step 635, the query component (315) determines whether the decremented value for "COUNT" is zero. In the current example, the query component (315) determines that the decremented value for "COUNT" is zero. This means that the query has been propagated to a maximum value of "COUNT". In response, a notification is transmitted (step 640) by the query component (315) to the user.

A similar process is followed by the third DBMS (515) upon receiving the query. For example, the query component within the third DBMS uses the associated query identifier (e.g. "QUERY_1") to determine (step 605) whether the query has been processed before by the third DBMS (515). The query has not been processed before by the third DBMS (515), so the query component queries (step 610) the databases controlled by the third DBMS (515), obtains the results (step 615) and transmits (step 620) the results to the user. The query component stores (step 625) the query identifier (e.g. "QUERY_1") and a current value for "COUNT" (e.g. "1") in the first storage component (320). The query component then decrements (step 630) the current value for "COUNT", wherein the resulting value for "COUNT" is "0". At step 635, the query component determines that the decremented value for "COUNT" is zero and transmits a notification is transmitted (step 640) by the query component (315) to the user. The query component (315) propagates the query to one or more of the remaining DBMSs in the distributed database federation (500) until the decremented value for "COUNT" is zero.

With reference to step 605, if the query has been processed before by the first DBMS (525), the query component (315) determines (step 645) whether a current value of "COUNT" is more then a stored value of "COUNT". If the current value of "COUNT" is more then a stored value of "COUNT", the process passes to step 610 onwards as a further propagation of a query can occur. If the current value of "COUNT" is not more then a stored value of "COUNT", the first DBMS (525) has already received the query from another DBMS. In this case the query is not propagated on and no further action is taken (step 650).

In this way the querying process exploits the way in which DBMSs in the distributed database federation are connected (that is, wherein a first DBMS is connected to a first subset comprising a pre-configurable number of other DBMSs; wherein a second DBMS in the first subset is connected to a second subset comprising a pre-configurable number of the remaining plurality of identified DBMSs and wherein the second subset comprises at least one DBMS which is not comprised in the first subset.)

The breadth of the search for the desired data within the distributed database federation can be controlled using the "COUNT" value. In this illustrative embodiment, the value of the "COUNT" indicates the number of degrees of separation between the originating DBMS and the last group of DBMSs to act on the query. In this context a single degree of separation is from one DBMS to another directly connected DBMS (in either direction). Each time the query is propagated over another degree of separation, the "COUNT" is decremented until the "COUNT" reaches zero and the propagation halts.

Consequently, the resources and bandwidth needed to support the query method described above scales logarithmically rather than combinatorially, thereby reducing the required effort to make a query within the database federation.

It should be understood that a DBMS can be added or removed from the federation. As a result, only the DBMSs to which a DBMS is added or removed from need be re-configured. Thus, network and management overhead is reduced when reconfiguring the database federation.

Figure 6B:
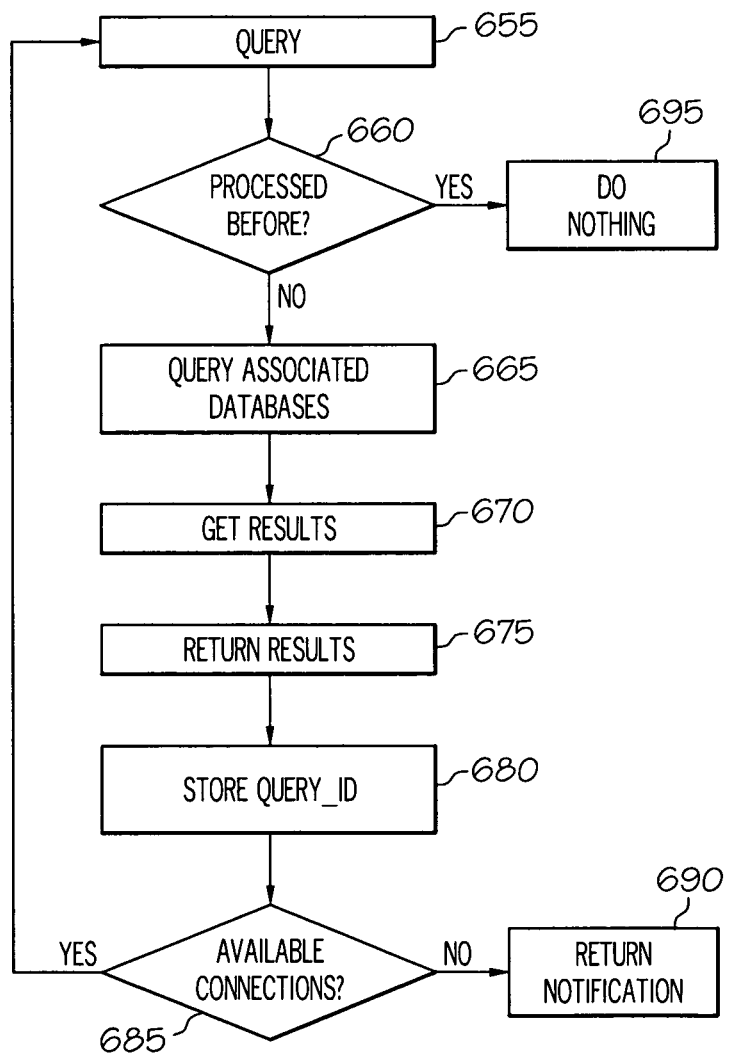
FIG. 6B is a flowchart of an illustrative method for propagating a query within a federated database, according to one embodiment of principles described herein.

The method and system described above for propagating a query is only one illustrative embodiment of the principles described herein. FIG. 6b is a flowchart illustrating an alternative process for propagating a query within a database federation. According to one illustrative embodiment, a query comprises an associated query identifier (e.g. a parameter "QUERY_ID" having an associated value). At step 655, a user initiates a query of the first DBMS (525) using the query component (315). The query component (315) uses the associated query identifier (e.g. "QUERY_2") to determine (step 660) whether the query has been processed before by the first DBMS (525).

If the query has not been processed before by the first DBMS (525), the query component (315) queries (step 665) the first database comprised on a back end computing system connected to the first DBMS (525) and the local database of the first DBMS (525). The query component (315) obtains the results (step 670) and transmits (step 675) the results to the user. The query component (315) stores (step 680) the query identifier (e.g. "QUERY_2") in the first storage component (320). At step 685, the query component (315) determines whether the first DBMS (525) has any connections to further DBMSs.

Again following the database federation network of FIG. 5, the query component (315) determines that the first DBMS (525) has a connection to the second DBMS (510) and a connection to the third DBMS (515). In response, the query component (315) propagates (step 655) the query to one or more of the remaining the DBMSs in the first set (i.e. one or more DBMSs directly connected to the first DBMS (525)). In the network illustrated in FIG. 5, for example, the query component (315) propagates (step 600) the query to each of the second DBMS (510) and the third DBMS (515).

The query component (315) uses the associated query identifier (e.g. "QUERY_2") to determine (step 660) whether the query has been processed before by the second DBMS (510). For example, the query component (315) may determine (step 660) that the query has been processed before by the second DBMS (510). This may be because a query propagated to the third DBMS (515) was processed and propagated to the second DBMS (510) before the query propagated from the first DBMS (525) reached the second DBMS (510). In response, no further action is taken (step 695). Consequently, the query is not processed again at the second DBMS (510), which improves processing overheads and conserves network bandwidth. Rather, the query can be propagated to remaining DBMSs (e.g. DBMSs 520 and 505) from the third DBMS (515).

The resiliency of a network refers to the ability of the network to deliver the desired performance despite malfunctions within various components of the network. In a federated database resilience can be improved by replicating data over a number of nodes. The need for additional resiliency is illustrated using the database federation (700) illustrated in FIG. 7. For purposes of explanation, the distributed database federation (700) operates under a general rule that a query is to be propagated a maximum of six times from an originating DBMS (705) to another DBMS (e.g. wherein a single propagation of a query is a propagation from one DBMS to another directly connected DBMS). A particular query is made from the originating DBMS with the instructions that query is to be propagated only five times (that is, one less than the maximum number of times). If the objective is query a target DBMS (705), the query may passes from the originating DBMS (705) to DBMS 710; DBMS 715; DBMS 730 and DBMS 740 to the target DBMS (750).

However, if a connection (755) fails, the query will be unsuccessful. This is because, by propagating the query five times, the query cannot reach the target DBMS (750). Even if the query is propagated six times from an originating DBMS (705), the query only reaches DBMS 740 (that is, the query passes from the originating DBMS (705) to DBMS 710; DBMS 715; DBMS 720; DBMS 725; DBMS 730 and DBMS 740).

Figure 8:
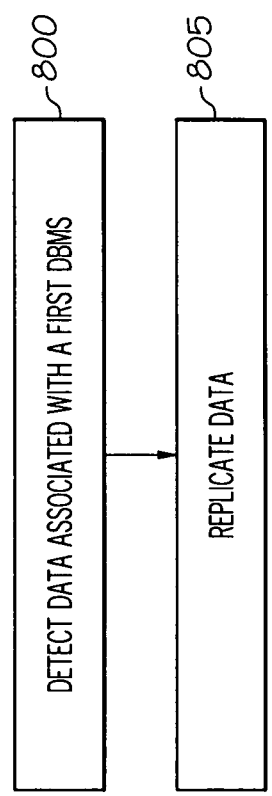
FIG. 8 is a flowchart of an illustrative method for replicating data within a database federation, according to one embodiment of principles described herein.

According to one exemplary embodiment, the resiliency of the network can be improved to allow data to be accessed in the event that a node or connection is lost. FIG. 8 is a flowchart of an illustrative method for replicating data within a database federation. In a first step, the replicator (325) detects that data is stored in one or more databases (step 800) associated with a first DBMS (750). At step 805, the replicator (325) obtains the data and replicates the data to a number of other databases associated with other DBMSs. In the example, the data is replicated to databases associated with DBMSs 735, 740 and 745.

Thus, if connection 755 fails, the query will still be successful if propagated six times, that is, the query passes from originating DBMS (705) to DBMS 710; DBMS 715; DBMS 720; DBMS 725; DBMS 730 and DBMS 740 (wherein the latter DBMS 740 comprises one or more databases that stores the replicated data).

According to one illustrative embodiment, data is replicated to a selectable number of other DBMSs such that there is an alterative path over which a query can be issued. As data is replicated to a number of other DBMSs, the data can still be accessed in light of a failure of a connection or a DBMS. Thus, resilience of the federated database is improved.

Furthermore, even if connection 755 does not fail, the data can be reached by propagating a query four times, rather than five as described above. That is, the query passes from originating DBMS (705) to DBMS 710; DBMS 715; DBMS 730 and DBMS 740 (wherein the latter DBMS 740 comprises one or more databases that stores the replicated data). Consequently, the query time can be significantly reduced, resulting in a more responsive and efficient system.

Figure 12:
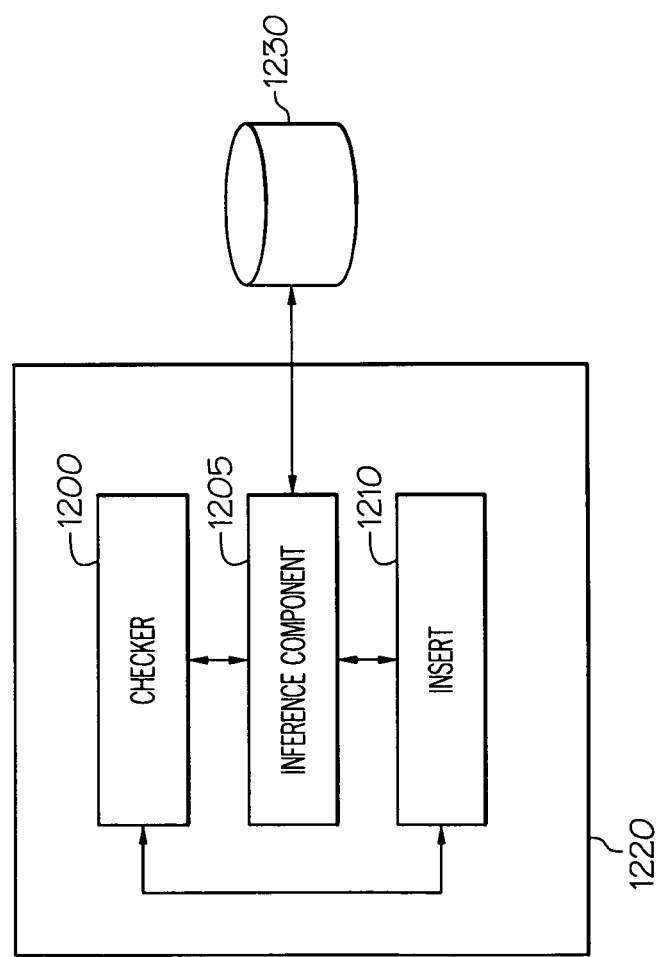
FIG. 12 is a block diagram of an illustrative apparatus for managing logical statements, according to one embodiment of principles described herein.

FIG. 12 is a block diagram of an illustrative apparatus (1220) for managing logical statements. According to one illustrative embodiment, a first DBMS node (105, FIG. 2) implements the apparatus for managing logical statements. In one embodiment, the first DBMS node (105) is within a distributed database federation (200) and comprises a connected back end computing system (115) with a back end database (120) and a local database (110). One or more of the databases (110, 120) may be configured to store two separate data structures: a non-unique fact table for storing non-unique logical statements and a unique fact table for storing unique logical statements.

According to one illustrative embodiment, the non-unique fact table in a database may comprises the following fields, wherein "ID" represents a unique identifier of a DBMS associated with the database and the database itself; "SUBJECT" represents a subject of a fact; "OBJECT" represents an object of the fact; "PREDICATE" represents a predicate of the fact; "TIME" represents a time associated with the fact being inserted into the table; and "SOURCE" represents a source associated with the fact:

TABLE 2

ID
SUBJECT
OBJECT
PREDICATE
TIME
SOURCE

As illustrated above, the non-unique fact table stores a fact and its source. The fact may have multiple instances in the non-unique fact table for a variety of reasons. By way of example and not limitation, the fact may have multiple instances in the non-unique fact table because a fact may have more than one associated sources.

According to one illustrative embodiment, the unique fact table is separate from the non-unique fact table and comprises the following fields, wherein "ID" represents a unique identifier of a DBMS associated with the database and the database itself, "SUBJECT" represents a subject of a fact; "OBJECT" represents an object of the fact; "PREDICATE" represents a predicate of the fact; and "TIME" represents a time associated with the fact being inserted into the table and "FACT_TYPE" represents whether the fact is an inserted fact or an inserted inferred fact:

TABLE 3

ID
SUBJECT
OBJECT
PREDICATE
TIME
FACT_TYPE

It should be understood that the first unique fact table only contains a unique facts. A unique fact comprises a unique combination of a subject, a predicate and an object. It should be understood that a unique inferred fact comprises a unique inferred combination of a subject, a predicate, and an object. According to one illustrative embodiment, the unique fact and the unique inferred fact are stored in the unique fact table.

According to one embodiment, the apparatus (1220) is installed at each DBMS in the distributed database federation. In one example, the apparatus can be implemented as an application. In another example, the apparatus can be implemented as a database stored procedure. The apparatus (1220) comprises a checker (1200), an inference component (1205), and an inserter (1210). The apparatus (1220) accesses a storage component (1230). According to one exemplary embodiment, the storage component may be a database connected to a back end computing system and/or a local database connected to the DBMS.

The checker (1200), responsive to receipt of a first logical statement for the first database management system node, verifies that the first logical statement is not already contained within one or more non-unique data structure or unique data structures. The inserter (1210), responsive to a determination of the checker, appropriately stores the first logical statement in one or more database data structures. The inference component (1205) analyzes the unique facts contained within the unique data table and infers new facts from combinations of related unique facts. One illustrative method to utilize the apparatus (1220) for management of logical facts is given below with reference to FIG. 13.

It should be understood that only the first unique fact table is used for inferring a fact. The checker (1200) and inserter (1210) are operable to access the first non-unique fact table and the first unique fact table. The inference component (1205) is operable to access a store (1230) comprising one or more logical operations.

Figure 13:
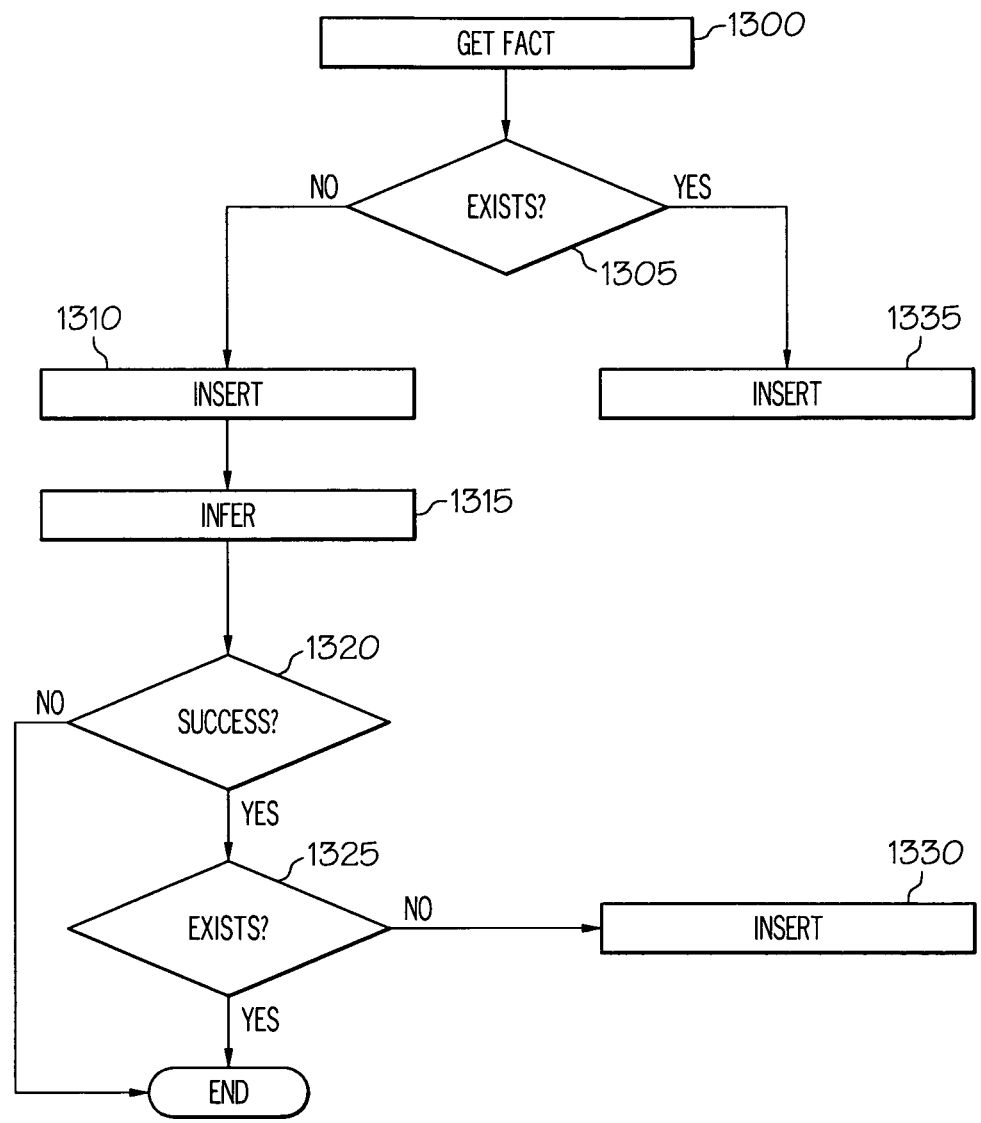
FIG. 13 is a flow chart of an illustrative method for managing a logical statement, according to one embodiment of principles described herein.

FIG. 13 is a flow chart of an illustrative method for storing a logical statement. In a first step the checker (1200) receives (step 1300) a first fact. By way of example and not limitation, the first fact may be:

"Cat is an animal"

At step 1305, the checker (1200) checks for the existence of the first fact. The checker (1200) may first check a database comprised on a back end computing system connected to a DBMS and a local database connected to the DBMS by issuing a query. According to one illustrative embodiment, the query checks for a correspondence between a first non-unique fact table and a first unique fact table.

According to one illustrative embodiment, the query process may propagate the query throughout the federated database as illustrated in FIG. 6b. By propagating the query throughout the database, each database in the federated database can be checked until it is determined that the first fact is stored one of the databases, or is a new fact that is not stored on any of the databases. Alternatively, if only a subset of the DBMSs need to be checked (e.g. DBMSs having IP addresses associated with a particular domain), the process of FIG. 6a can be used. As explained above, by decrementing a count with each propagation cycle, the extent to which the query is propagated can be controlled.

According to one illustrative embodiment, if the first fact does not exist on any database within the scope of the query, the inserter (1210) replicates the first fact by inserting it into a first non-unique fact table (step 1335). As illustrated above with respect to facts stored in the non-unique fact table, the first fact is stored together with any metadata associated with a source of the first fact such as a document identifier. Storing metadata associated with a source of the first fact allows for multiple instances of the same fact derived from different sources to be stored and differentiated. Additional metadata, such as a timestamp, may also aid with determination of the origin, creation, production, or discovery of the first fact.

If the query process determines that the first fact does not exist on any database directly associated with originating DBMS, inserter (1210) inserts (step 1310) the first fact (and metadata associated with a source of the first fact) in a first non-unique fact table of a specified database. The resulting first non-unique fact table is shown below:

TABLE 4

| ID | DBMS_1; DB_A |
|---|---|
| SUBJECT | Cat |
| OBJECT | Animal |
| PREDICATE | is an |

TABLE 4-continued

| | |
|---|---|
| TIME | 14:50 |
| SOURCE | Doc_1 |

The first fact (and metadata associated with a source of the first fact) can be accessed from the first non-unique fact table by any DBMS in the distributed database federation by using the querying processes of FIG. 6a or FIG. 6b.

For example, the process of FIG. 6a can be use to propagate a query to find the first fact, where the query includes an associated query identifier and count value. Following the process described in FIG. 6a, the distributed database federation is accessed within an associated limited number of "propagations", wherein a single propagation of a query is a propagation from one DBMS to another directly connected DBMS (in either direction).

Additionally or alternatively, the process of FIG. 6b can be used, wherein the query process continues until it is determined that a query has been processed before by a DBMS. The querying process of FIG. 6b is configured to exploit the way in which DBMSs in the distributed database federation are connected. Specifically, the interconnection between DBMSs includes a first DBMS is connected to a first subset includes a pre-configurable number of other DBMSs; a second DBMS in the first subset is connected to a second subset which includes a pre-configurable number of the remaining plurality of identified DBMSs; and the second subset comprises at least one DBMS which is not comprised in the first subset. The query process and federated topology allows for efficient connections between DBMS nodes and query propagation throughout the federated database. Specifically, the database federation can provide a distributed repository for storing triples; however, each DBMS need not be fully interconnected to another DBMS.

In response to the determination that the first fact does not exist on any database of a back end computing system connected to a DBMS or any local database connected to a DBMS, the inserter (1210) inserts (step 1310) the first fact in a first unique fact table of the database specified according to an associated instruction.

Storing the first fact in a first unique fact table if the first fact does not exist on any database of a back end computing system connected to a DBMS or any local database connected to a DBMS prevents duplication. This is can lead to particularly significant resource savings and efficiencies within a distributed database federation.

Figure 7:
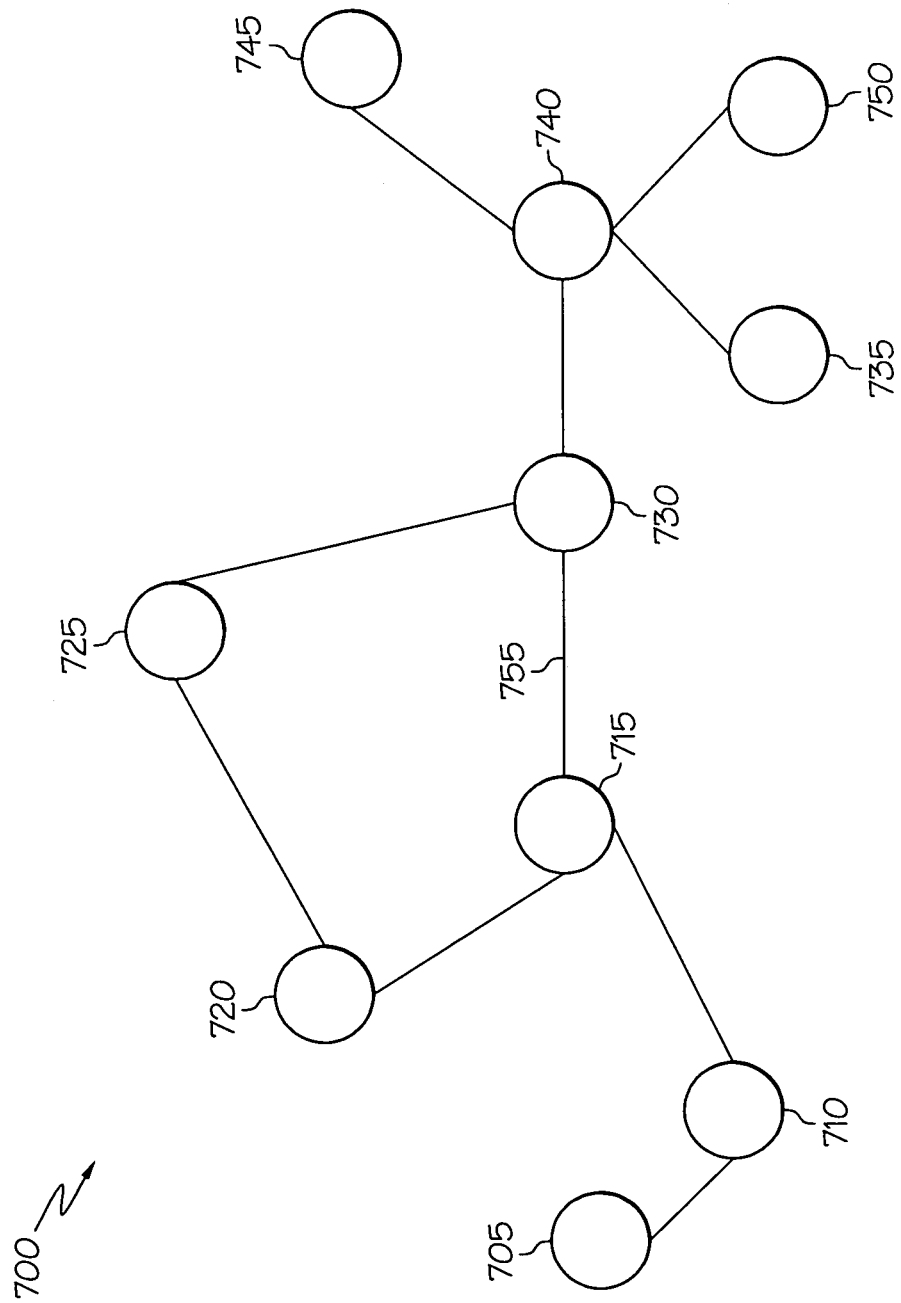
FIG. 7 is a flowchart of an illustrative database federation, according to one embodiment of principles described herein.

To improve resilience, the first fact can be selectively replicated to a number of other DBMSs according to FIG. 7. It should be understood that the first fact can be accessed from the first unique fact table by any DBMS in the distributed database federation by using the querying processes of FIG. 6a or the process of FIG. 6b.

The resulting first unique fact table is shown below:

TABLE 5

| | |
|---|---|
| ID | DBMS_1; DB_A |
| SUBJECT | Cat |
| OBJECT | Animal |
| PREDICATE | is an |
| TIME | 14:50 |
| FACT_TYPE | Fact |

At step 1315, the inference component (1205), uses the inserted first fact to infer one or more new facts. To do this, the inference component (1205) compares the inserted first fact against the first unique fact table and the store (1230) comprising one or more logical operations. For example, the store (1230) may comprises the following logical operation which represents that if a set "SUBJECT" is a subset of a set "OBJECT_1" and if "OBJECT_1" is a subset of set "OBJECT_2", then the set ("SUBJECT") is also a subset of the set "OBJECT_2":

IF "SUBJECT" is a member of "OBJECT_1"
AND "OBJECT_1" is a member of "OBJECT_2"
THEN "SUBJECT" is a member of "OBJECT_2"

At step 1320, the inference component (1205) determines whether one or more new facts have been inferred. If an inference cannot be made, such as when logical operations do not result in an inference when applied to all the facts within the first unique fact table (negative result to step 1320), the process ends.

To continue the example above, a second fact is generated (e.g. by a user, a system etc.) and received by the federated database together with any additional metadata (such as time code, origination) and instructions (such as which database it is to be stored in). For example, the second fact may comprise:
"Ben is a cat"

In accordance with the method illustrated in FIG. 13, the checker (1200) receives (step 1300) the second fact. At step 1305, the checker (1200) checks for the existence of the second fact. First, the checker (1200) checks a database comprised on a back end computing system connected to a DBMS and a local database connected to the DBMS by issuing a query having a query identifier using the process of FIG. 6b. In the current example, the query component (315) determines that the second fact does not exist on any database of a back end computing system connected to a DBMS or any local database connected to a DBMS. Consequently, the inserter (1210) inserts (step 1310) the second fact in a first non-unique fact table of the database specified according to the instruction.

The resulting first non-unique fact table is shown below:

TABLE 6

| ID | DBMS_1; DB_A | DBMS_1; DB_A |
|---|---|---|
| SUBJECT | Cat | Ben |
| OBJECT | Animal | Cat |
| PREDICATE | is an | Is a |
| TIME | 14:50 | 15:00 |
| SOURCE | Doc_1 | Doc_2 |

Furthermore, the inserter (1210) inserts (step 1310) the second fact in a first unique fact table of the database specified according to the instruction.

TABLE 7

| ID | DBMS_1; DB_A | DBMS_1; DB_A |
|---|---|---|
| SUBJECT | Cat | Ben |
| OBJECT | Animal | Cat |
| PREDICATE | is an | Is a |
| TIME | 14:50 | 15:00 |
| FACT_TYPE | Fact | Fact |

At step 1315, the inference component (1205), uses the inserted second fact to infer one or more new facts by comparing the inserted second fact against the first unique fact table and the store (1230) comprising one or more logical operations.

At step 1320, the inference component (1205) determines whether one or more new facts have been inferred. For example, the inference component (1205) may apply the logical operation described above which represents that if a set "SUBJECT" is a subset of a set "OBJECT_1" and if "OBJECT_1" is a subset of set "OBJECT_2", then the set ("SUBJECT") is also a subset of the set "OBJECT_2 logical rule. Applying this logical operation result in the following:

IF "Ben" is a member of "Cat"
AND "Cat" is a member of "Animal"
THEN "Ben" is a member of "Animal"

The inference component (1205) determines that logical rule is fulfilled by the first fact and second fact and infers a new (third) fact (positive result to step 1320) by mapping the last logical sub operation (i.e. "Ben" is a member of "Animal") to a template fact (e.g. "SUBJECT" is an "OBJECT_2"). The third fact is shown below:

Ben is an animal

At step 1325, the checker (1200) checks the first unique fact table for the existence of the third fact. If the third fact does exist in the first unique fact table (positive result to step 1325), the process ends. However, if the checker (1200) determines that the third fact does not exist in the first unique fact table (negative result to step 1325) and in response, the inserter (1210) inserts (step 1330) the third fact in the first unique fact table. According to one illustrative embodiment, the third fact is inserted in the database specified according to the instruction associated with the second fact.

In some cases, the third fact may be inserted in the first unique fact table only. Storing the third (inferred) fact in a first unique fact table if the third fact does not exist on any database of a back end computing system connected to a DBMS or any local database connected to a DBMS prevents duplication. To improve resilience, the third fact can be selectively replicated to one or more DBMSs within the federated database as described in relation to FIG. 7.

A fact can be inferred within one DBMS without each of the other DBMSs in the distributed database federation needing to be made aware or participating in the process. Furthermore, the inference process can be automatically triggered by the insertion of a fact. As a result, in response to a fact being inferred at one DBMS, each of the other DBMSs in the distributed database federation need not be updated with the inferred fact or carry out inferring. Consequently, the processing overhead associated with storing inferred facts and inferring facts is reduced. It should be understood that the third fact can be accessed from the first unique fact table by any DBMS in the distributed database federation by using the querying processes of FIG. 6a or FIG. 6b.

The resulting first unique fact table is shown below:

TABLE 8

| ID | DBMS_1;<br>DB_A | DBMS_1;<br>DB_A | DBMS_1;<br>DB_A |
|---|---|---|---|
| SUBJECT | Cat | Ben | Ben |
| OBJECT | Animal | Cat | Animal |
| PREDICATE | is an | is a | is an |
| TIME | 14:50 | 15:00 | 15:30 |
| FACT_TYPE | Fact | Fact | Inferred |

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for managing a logical statement within a distributed database comprising:

checking, responsive to receipt of a first logical statement by first database management system node, whether the first logical statement is stored within the distributed database, said distributed database comprising a plurality of nodes, each node comprising a database managed by an independently operating database management system; and, responsive to a determination that the first logical statement is not stored within the distributed database, inserting the first logical statement in a unique fact table, said unique fact table being separate from a non-unique fact table in which are stored facts that are stored at more than one location within said distributed database.

2. The method of claim 1, further comprising inferring a second logical statement by applying a logical rule to logical statements contained within the unique fact table.

3. The method of claim 2, further comprising automatically beginning the inferring of the second logical statement based on said first logical statement and in response to insertion of the first logical statement in said unique fact table by a database management system node.

4. The method of claim 2, further comprising:
checking whether the second logical statement has been previously stored in the distributed database; and
storing said second logical statement, responsive to a determination that the second logical statement is not stored within the distributed database in the unique fact table.

5. The method of claim 4, further comprising marking the stored second logical statement as an inferred fact.

6. The method of claim 1, further comprising
receiving a first logical statement;
responsive to the receipt of the first logical statement, accessing a store containing logical rules;
applying the logical rules to the first logical statement and a plurality of logical statements contained in a unique fact table; and
inferring a second logical statement based on the application of the logical rules.

7. The method of claim 1, further comprising storing the logical statements as triples with associated metadata, the associated metadata comprising at least one of: a node identifier, a triple identifier, a time stamp, a source identifier, and a fact type.

8. The method of claim 1, further comprising selectively replicating data in the unique fact table to at least one other database within the distributed database.

9. The method of claim 1, further comprising propagating a query for determining whether the first logical statement is contained within a segment of the distributed database.

10. The method of claim 9, further comprising controlling an extent of the query by restricting a maximum number of propagations of the query using a count value, wherein a propagation of the query is a transmission of the query from the first node to another directly connected node.

11. The method of claim 9, further comprising querying a database of the first database management system node if the first database management system node has not processed the query before.

12. The method of claim 1, further comprising inserting the first logical statement into said non-unique fact table responsive to the determination that the first logical statement is already stored within the distributed database.

13. The method of claim 12, further comprising storing an indication of a source of said first logical statement in said non-unique fact table.

14. The method of claim 1, wherein the distributed database comprises:
a plurality of connectable database management system nodes, each of the database management system nodes comprising at least one database;
at least one connection configured to propagate a query from the first node to a first subset of the plurality of nodes;
at least one connection configured to propagate a query from a second node in the first subset to a second subset of the plurality of nodes;
wherein at least one node in the second subset is different from the nodes in the first subset.

15. The method of claim 1, further comprising, also responsive to a determination that the first logical statement is not stored within the distributed database, inserting the first logical statement in a non-unique fact table in addition to having inserted the first logical statement in said unique fact table.

16. An apparatus for managing logical statements for use with a system comprising a first data structure for storing non-unique logical statements and a separate second data structure for storing unique logical statements under control of a first database management system node of a distributed database, said distributed database comprising a plurality of nodes, each node comprising a database managed by an independently operating database management system, the apparatus comprising:
a computing device comprising at least one processor, said at least one processor being configured to implement:
a checker, responsive to receipt of a first logical statement for the first database management system node, for checking whether the first logical statement is stored in the distributed database; and
an inserter, responsive to a determination that the first logical statement is not stored in the distributed database, for storing the first logical statement in the second data structure for storing unique logical statement; and, responsive to a determination that the fist logical statement is stored in the distributed database, for storing the first logical statement in the first data structure for storing non-unique logical statements.

17. The apparatus of claim 16, further comprising an inference component for inferring a second logical statement by using the second data structure.

18. The apparatus of claim 17, wherein the inference component is operable to execute in response to receipt of a logical statement by a database management system node.

19. The apparatus of claim 17, wherein the query component is operable to query a database of the first node if the first node has not processed the query before.

20. The apparatus of claim 16, wherein the system comprises a plurality of connectable database management system nodes, each of the database management system nodes comprising at least one database, the apparatus comprising:
a determiner for selecting the first node of the plurality of nodes;
a generator for generating one or more connections operable to propagate a query from the first node to a first subset of the plurality of nodes and for generating one more connections operable to propagate a query from a second node in the first subset to a second subset of the plurality of nodes; wherein at least one node in the second subset is different from the nodes in the first subset; and
a query component for propagating a query, wherein a propagation of the query is a transmission of the query from the first node to another directly connected node.

21. The apparatus of claim 16, wherein the query is associated with a count value of a maximum number of propagations; the query component being operable to propagate the query in accordance with the count value.

22. The apparatus of claim 16, wherein the logical statements are triples with associated metadata, the associated metadata comprising at least one of: a node identifier, a triple identifier, a time stamp, a source identifier, and a fact type.

23. The apparatus of claim 16, wherein said inserter is configured to mark the stored second logical statement as an inferred fact.

24. The apparatus of claim 13, wherein said inserter is configured to store an indication of a source of said first logical statement in said first data structure for storing non-unique logical statements.

25. A computer program product for managing logical statements in a distributed database, the computer program product comprising:

a computer usable memory device having computer usable program code embodied therewith, the computer usable program code comprising:

computer usable program code configured to receive a first logical statement;

computer usable program code configured to check a segment of the distributed database to determine if the first logical statement is currently stored within the distributed database, said distributed database comprising a plurality of nodes, each node comprising a database managed by an independently operating database management system;

computer usable program code configured to store the first logical statement in a unique fact table, responsive to a determination that the first logical statement is not stored within the distributed database and to store the first logical statement in a separate non-unique fact table in response to a determination that the first logical statement is already stored within the distributed database; and computer usable program code configured to, if the first logical statement is stored in the unique fact table, infer a second logical statement by applying a logical rule to the first logical statement in combination with other logical statements stored within the distributed database.

* * * * *